US008321191B2

(12) United States Patent
Jones, III (10) Patent No.: US 8,321,191 B2
(45) Date of Patent: *Nov. 27, 2012

(54) METHOD OF CLASSIFYING PLANT EMBRYOS USING PENALIZED LOGISTIC REGRESSION

(75) Inventor: John E. Jones, III, Seattle, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 1800 days.

This patent is subject to a terminal disclaimer.

(21) Appl. No.: 11/217,205

(22) Filed: Sep. 1, 2005

(65) Prior Publication Data

US 2006/0068372 A1 Mar. 30, 2006

Related U.S. Application Data

(60) Provisional application No. 60/613,599, filed on Sep. 27, 2004.

(51) Int. Cl.
*G06G 7/48* (2006.01)
*G01N 33/48* (2006.01)
(52) U.S. Cl. ............................................. 703/11; 702/19
(58) Field of Classification Search .................. None
See application file for complete search history.

(56) References Cited

FOREIGN PATENT DOCUMENTS
WO WO 99/63057 * 12/1999

OTHER PUBLICATIONS

Dettling et al. (Seminar für Statistik, Eidgnössiche Technische Hochschule, Research Report No. 115, "Supervised gene clustering with penalized logistic regression", p. 1-19, May 2003).*
Holmes et al. (P.L. Lanzi, W. Stolzmann, and S.W. Wilson (Eds.): IWLCS 2001, LNAI 2321, pp. 43-56, 2002).*
Pearce et al. (Ecological Modelling, vol. 133, p. 225-245, 2000).*
Dorling et al. (Atmospheric Environment, vol. 37, p. 3435-3443, 2003).*
Eilers, P.H.C., et al., "Classification of Microarray Data With Penalized Logistic Regression," *Proc. Int. Symp. Biomedical Optics*, San Jose, Jan. 20-26, 2001, vol. 4266, pp. 187-198.
Le Cessie, S., and J.C. van Houwelingen, "Ridge Estimators in Logistic Regression," *Appl. Statist.* 41(1):191-201, 1992.
Van Houwelingen, H.C., "Predicting Clinical Outcome With High-Dimensional Micro-Array Data," 2001, <http://www.biometrie.uni-heidelberg.de/workshops/bamm2001/talk_houwelingen.pdf>.
Van Houwelingen, H.C., and S. le Cessie, "Shrinkage and Penalized Likelihood as Methods to Improve Predictive Accuracy," *Statistica Neerlandica* 55(1):17-34, Mar. 2001.
Zhu, J., and T. Hastie, "Classification of Gene Microarrays by Penalized Logistic Regression," *Biostatistics* 5(3):427-443, Jul. 2004.

* cited by examiner

*Primary Examiner* — Larry D Riggs, II
(74) *Attorney, Agent, or Firm* — Weyerhaeuser Law Dept (57) ABSTRACT

A method is disclosed for classifying plant embryos according to their quality using a penalized logistic regression (PLR) model. First, sets of image or spectral data are acquired from plant embryos of known quality, respectively. Second, each of the acquired sets of image or spectral data is associated with one of multiple class labels according to the corresponding embryo's known quality. Third, sets of metrics are calculated based on the acquired sets of image or spectral data, respectively. Fourth, a penalized logistic regression (PLR) analysis is applied to the sets of metrics and their corresponding class labels to develop a PLR-based classification model. Fifth, image or spectral data are acquired from a plant embryo of unknown quality, and metrics are calculated based therefrom. Sixth, the PLR-based classification model is applied to the metrics calculated for the plant embryo of unknown quality to classify the same.

13 Claims, 4 Drawing Sheets

METHOD OF CLASSIFYING PLANT EMBRYOS USING PENALIZED LOGISTIC REGRESSION

CROSS REFERENCE TO RELATED APPLICATION

The present application claims the benefit of U.S. Provisional Application No. 60/613,599, filed Sep. 27, 2004.

FIELD OF THE INVENTION

The invention is directed to classifying plant embryos to identify those embryos that are likely to successfully germinate and grow into normal plants, and more particularly, to a method for classifying plant embryos using a penalized logistic regression model.

BACKGROUND OF THE INVENTION

Reproduction of selected plant varieties by tissue culture has been a commercial success for many years. The technique has enabled mass production of genetically identical selected ornamental plants, agricultural plants, and forest species. The woody plants in this last group have perhaps posed the greatest challenges. Some success with conifers was achieved in the 1970s using organogenesis techniques wherein a bud, or other organ, was placed on a culture medium where it was ultimately replicated many times. The newly generated buds were placed on a different medium that induced root development. From there, the buds having roots were planted in soil.

While conifer organogenesis was a breakthrough, costs were high due to the large amount of handling needed. There was also some concern about possible genetic modification. It was a decade later before somatic embryogenesis achieved a sufficient success rate so as to become the predominant approach to conifer tissue culture. With somatic embryogenesis, an explant, usually a seed or seed embryo, is placed on an initiation medium where it multiplies into a multitude of genetically identical immature embryos. These can be held in culture for long periods and multiplied to bulk up a particularly desirable clone. Ultimately, the immature embryos are placed on a development medium where they are intended to grow into somatic analogs of mature seed embryos. As used in the present description, a "somatic" embryo is a plant embryo developed by the laboratory culturing of totipotent plant cells or by induced cleavage polyembryogeny, as opposed to a zygotic embryo, which is a plant embryo removed from a seed of the corresponding plant. These embryos are then individually selected and placed on a germination medium for further development. Alternatively, the embryos may be used in artificial seeds, known as manufactured seeds.

There is now a large body of general technical literature and a growing body of patent literature on embryogenesis of plants. Examples of procedures for conifer tissue culture are found in U.S. Pat. Nos. 5,036,007 and 5,236,841 to Gupta et al.; U.S. Pat. No. 5,183,757 to Roberts; U.S. Pat. No. 5,464,769 to Attree et al.; and U.S. Pat. No. 5,563,061 to Gupta. Further, some examples of manufactured seeds can be found in U.S. Pat. No. 5,701,699 to Carlson et al., the disclosure of which is hereby expressly incorporated by reference. Briefly, a typical manufactured seed is formed of a seed coat (or a capsule) fabricated from a variety of materials such as cellulosic materials, filled with a synthetic gametophyte (a germination medium), in which an embryo surrounded by a tube-like restraint is received. After the manufactured seed is planted in the soil, the embryo inside the seed coat develops roots and eventually sheds the restraint along with the seed coat during germination.

One of the more labor intensive and subjective steps in the embryogenesis procedure is the selective harvesting from the development medium of individual embryos suitable for germination (e.g., suitable for incorporation into manufactured seeds). The embryos may be present in a number of stages of maturity and development. Those that are most likely to successfully germinate into normal plants are preferentially selected using a number of visually evaluated screening criteria. A skilled technician evaluates the morphological features of each embryo embedded in the development medium, such as the embryo's size, shape (e.g., axial symmetry), cotyledon development, surface texture, color, and others, and selects those embryos that exhibit desirable morphological characteristics. This is a highly skilled yet tedious job that is time consuming and expensive. Further, it poses a major production bottleneck when the ultimate desired output will be in the millions of plants.

It has been proposed to use some form of instrumental image analysis for embryo selection to supplement or replace the visual evaluation and classification described above. For example, International Patent Application No. PCT/US99/12128 (WO 99/63057), explicitly incorporated by reference herein, discloses a method for classifying somatic embryos based on images of embryos or spectral information obtained from embryos. Generally, the method develops a classification model (or a "classifier") based on the digitized images or NIR (near infrared) spectral data of embryos of known embryo quality (e.g., potential to germinate and grow into normal plants, as validated by actual planting of the embryos and a follow-up study of the same or by the morphological comparison to normal zygotic embryos). A "classifier" is a system that identifies an input by recognizing that the input is a member of one of a number of possible classes. The classifier is then applied to an image or spectral data of an embryo of unknown quality to classify the embryo according to its presumed embryo quality.

Various classification models, or classifiers, are available, such as Fisher's linear and quadratic discriminant functions, classification trees, k-nearest-neighbors clustering, neural networks, and SIMCA. All of these models have been successfully used in many applications, but have been found to perform below expectations when classifying embryos because they either fail to be fast enough or the data from the embryos do not meet the requirements for these classifiers to work.

PCT/US99/12128 (WO 99/63057), incorporated above, discloses an embryo classifier using a Lorenz curve and a Bayes optimal classifier, termed "Lorenz-Bayes" classifier. Furthermore, co-assigned and co-pending U.S. Provisional Patent Application Ser. No. 60/507,631, filed Sep. 30, 2003, describes a generalized form of Lorenz-Bayes classifier for classifying plant embryos. While these methods have been successful in rapidly and accurately classifying embryos according to their embryo quality, there is a continuing need to further increase the classification speed and accuracy in order to achieve mass classification required for mass production of manufactured seeds. The present invention addresses this continuing need.

SUMMARY OF THE INVENTION

The present invention is directed to classification of plant embryos by the application of classification algorithms to digitized images and/or data relating to or based on the absorption, transmittance, reflectance, or excitation spectra of the embryos. While the classification methods of the invention are applied to image and spectral information acquired from embryos, the invention is not concerned with or limited to any particular method of acquiring image or spectral information. In fact, the methods may be applied to image and spectral information acquired based on a variety of technologies, which are available at the present time and may be developed in the future, including relatively more complex technologies such as multi-viewpoint imaging (e.g., imaging a top view, side view, and end view of an embryo), imaging in color, imaging using non-visible portions of the electromagnetic spectrum, imaging using fluorescent proteins and/or quantum dots markers of specific molecules, and imaging using energy input to embryos to get certain molecules, tissues, or organs to emit particular energies that can be detected. Image or spectral data may be obtained from whole plant embryos or any portion(s) thereof.

A classification model is developed based on raw digital image or spectral data of reference samples of plant embryos of known embryo quality. The embryo quality of the reference samples may be determined based on the embryo's conversion potential, resistance to pathogens, drought resistance, and the like, as validated by actual planting of the embryos and a follow-up study of the same, or by morphological comparison of the embryos to normal zygotic embryos. Optionally, the raw digital or spectral data may be preprocessed using one or more preprocessing algorithms to reduce the amount of raw image or spectral data; then one or more "metrics" are calculated from the raw digital or spectral data, or from the preprocessed data.

"Metrics" may be any quantifiable attribute or statistical values that capture some information about an embryo including, but not limited to, geometric values (length, height, perimeter distance, area enclosed by the perimeter, etc., of an embryo), color or texture related values, and spectral values (absorption, transmittance, or reflectance at discrete wavelengths, etc.). Also, "metrics" may be inclusive of the raw digital or spectral data.

According to the present invention, a penalized logistic regression (PLR) analysis is applied to the sets of metrics, wherein each set of metrics is obtained from an embryo whose embryo quality is known, to develop a PLR-based classification model (classifier). The developed classification model can then be used to classify embryos of unknown quality according to their putative quality.

Specifically, according to one aspect of the present invention, a method is provided to classify plant embryos according to their quality. The method includes generally six steps. First, sets of image and/or spectral data are acquired from plant embryos of known quality, respectively. Second, each set of image and/or spectral data obtained from an embryo is associated with one of multiple class labels according to the embryos' known quality. For example, two class labels (e.g., high quality and low quality) may be used, or alternatively, three or more class labels may be used, to be each associated with a set of image or spectral data according to the known quality of the embryo from which the set of image or spectral data is obtained. Third, a set of metrics is calculated based on each set of image or spectral data obtained from an embryo. Thus, at this point, each set of metrics calculated from a set of image or spectral data obtained from an embryo is associated with a particular class label indicative of that embryo's known quality. Fourth, a penalized logistic regression (PLR) analysis is applied to the sets of metrics and their corresponding class labels to develop a PLR-based classification model. Fifth, image or spectral data are acquired from a plant embryo of unknown quality, and a set of metrics is calculated based on the acquired image or spectral data of the embryo of unknown quality. Sixth, the PLR-based classification model is applied to the set of metrics calculated for the plant embryo of unknown quality to classify the same.

According to another aspect of the present invention, a method is provided to develop a classification model for classifying plant embryos according to their quality. The method includes generally three steps. First, sets of image and/or spectral data of plant embryos of known quality are received, and one of multiple class labels is assigned to each set of image and/or spectral data obtained from an embryo according to the embryos' known quality. Second, a set of metrics is calculated based on the received set of image and/or spectral data of each embryo. Third, a penalized logistic regression (PLR) analysis is applied to the sets of metrics and their corresponding class labels to develop a PLR-based classification model.

According to another aspect, a method of the present invention is implemented in the form of computer-executable instructions (software) running on a computer. In one embodiment, the instructions, when loaded onto a computer, perform generally two steps: (a) receiving sets of metrics calculated based on sets of image and/or spectral data of plant embryos of known quality, respectively, wherein each set of metrics is associated with one of multiple class labels according to the known quality of the embryo from which the set of metrics is obtained; and (b) applying a penalized logistic regression (PLR) analysis to the received sets of metrics and their corresponding class labels to develop a PLR-based classification model. In a further embodiment, the instructions further perform the additional steps of: (c) receiving a set of metrics calculated based on acquired image or spectral data of a plant embryo of unknown quality; and (d) applying the PLR-based classification model to the received metrics of the plant embryo of unknown quality to classify the same.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The methods of the present invention may be used to classify any type of plant embryos, including both zygotic and somatic embryos, according to their embryo quality. The embryo quality may be determined based on any criteria susceptible to characterization or quantification. For example, the embryo quality may be determined based on one or more criteria, such as the embryo's conversion potential (i.e., potential for germination and subsequent plant growth and development), resistance to pathogens, drought resistance, heat and cold resistance, salt tolerance, preference for (or indifference to) light quality, suitability for long term storage, and the like. As more information is known about plant embryos and their desirability, more criteria may be developed to further refine the selection process to identify only truly "high-quality" embryos with various desirable characteristics. In various exemplary embodiments of the present invention, plant embryos are to be classified into two or more quality classes using any one or more of these classification criteria. For example, plant embryos may be classified into two classes: a class of acceptable, relatively high-quality embryos, and another class of unacceptable, relatively low-quality embryos. Alternatively, plant embryos may be classified into three or more classes.

Embryos from all plant species may be classified using the methods of the present invention. The methods, however, have particular application to agricultural plant species where large numbers of somatic embryos are used to propagate desirable genotypes, such as forest tree species. Specifically, the methods can be used to classify somatic embryos from the conifer tree family Pinaceae, particularly from the genera: *Pseudotsuga* and *Pinus*.

Figure 1:
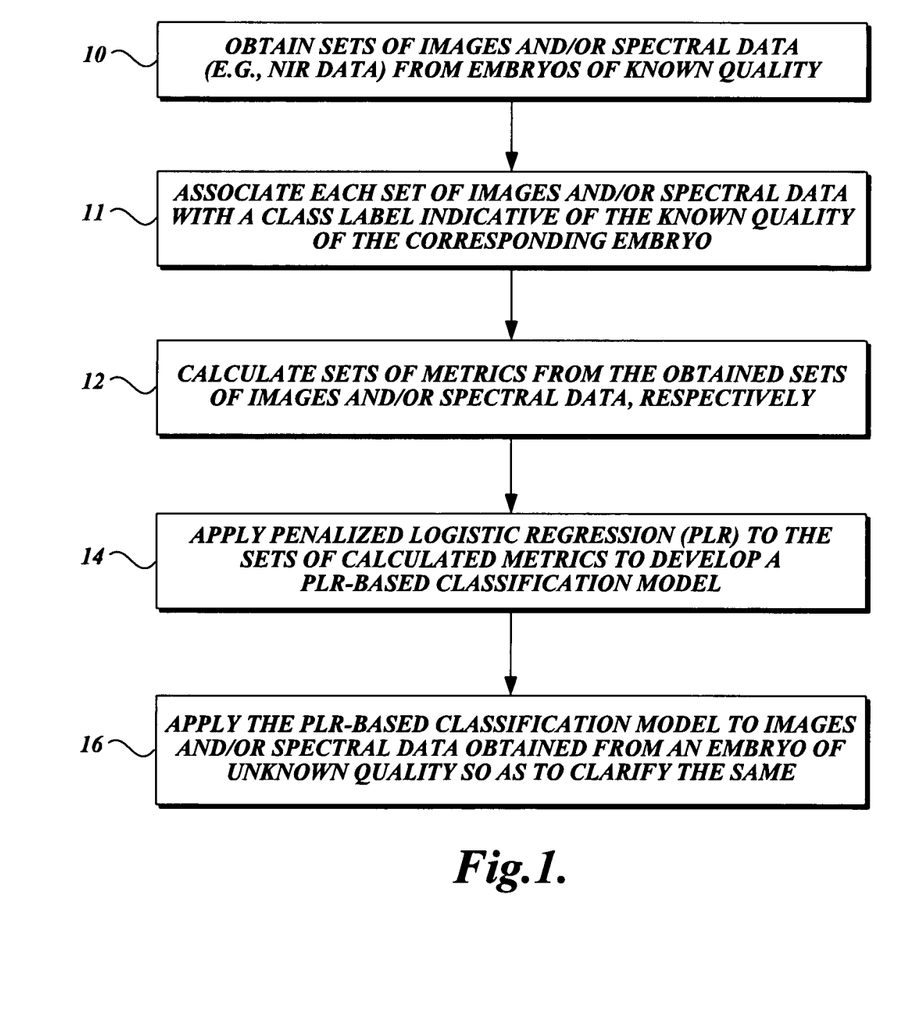
FIG. 1 is a flowchart illustrating an overall method of the present invention for classifying embryos using penalized logistic regression (PLR)

FIG. 1 illustrates general steps involved in a method of the present invention. In block 10, as a preliminary step of the method, sets of image data and/or spectral data are obtained from plant embryos (or any portions thereof), respectively, using one or more views (top view, side view, end view, etc.) using any known or to-be-developed technology, such as an electronic camera containing a charge-coupled device (CCD) linked to a digital storage device. Spectrometric image acquisition and analysis of embryos can be performed using a data collection setup that includes, for example, a light source (e.g., NIR source), a microscope, a light sensor, and a data processor. Using such a setup, embryos or embryo regions are scanned and spectral data are acquired regarding absorption, transmittance, reflectance, or excitation of electromagnetic radiation at one or more discrete wavelengths or wavelength bands. Further, images can be acquired of radiographic or fluorescent protein or quantum-dot chemical markers. Differences in spectral data collected from embryos of high quality versus those of low quality are presumed to reflect differences in chemical composition that are related to embryo quality. Any suitable data acquisition protocols can be used to specify embryo sampling methods, the amount of data required, or repeated measurement required to obtain data of sufficient quality, to make satisfactory classifications of the embryos.

Optionally, the acquired raw digital image or spectral data can be preprocessed using suitable preprocessing algorithms. Any such algorithms apparent to one skilled in the art may be used, for example, to remove background information (i.e., any data derived from non-embryo sources such as background light scatter or other noise), or to reduce the size of the digital or spectral data file. For example, U.S. Pat. No. 5,842,150 discloses that NIR spectral data can be preprocessed prior to multivariate analysis using the Kubelka-Munk transformation, the Multiplicative Scatter Correction (MSC), the Fourier transformation, or the Standard Normal Variate transformation, all of which can be used to reduce noise and adjust for drift and diffuse light scatter. As another example, the amount of digital data required to represent an acquired image or spectrum of an embryo can be reduced using interpolation algorithms, such as wavelet decomposition. See for example, Chui, C. K., *An Introduction to Wavelets*, Academic Press, San Diego, 1992; Kaiser, Gerald, *A Friendly Guide to Wavelets*, Birkhauser, Boston; and Strang, G. and T. Nguyen, *Wavelets and Filter Banks*, Wellesley-Cambridge Press, Wellesley, Mass. Wavelet decomposition has been used extensively for reducing the amount of data in an image, and for extracting and describing features from biological data. A variety of other interpolation methods can be used to similarly reduce the amount of data in an image or spectral data file, such as calculation of adjacent averages, Spline methods (see for example, C. de Boor, *A Practical Guide to Splines*, Springer-Verlag, 1978), Kriging methods (see for example, Noel A. C. Cressie, *Statistics for Spatial Data*, John Wiley, 1993), and other interpolation methods which are commonly available in software packages that handle images and matrices. The results from an interpolation algorithm or functions thereof are then used as inputs for calculating "metrics," described below.

In FIG. 1, block 11, each set of image and/or spectral data obtained from an embryo of known quality is associated with one of multiple class labels according to the embryos' known quality. For example, each embryo (and hence the image and/or spectral data obtained therefrom) may be labeled as belonging to one of two classes, high quality and low quality, or to one of three or more classes, such as high quality, medium quality, and low quality.

In FIG. 1, block 12, sets of metrics are calculated based on the sets of image data and/or spectral data obtained from the reference embryos of known quality, respectively. "Metric" refers to any scalar statistical value calculated from image and/or spectral data that captures information. In other words, a metric is any attribute value that contains some quantifiable information about an embryo. In image processing language, sets of metrics are also known as feature vectors. As non-limiting examples, metrics may include central and non-central moments, functions of the spectral energy at specific wavelengths, and any function of one or more of these statistics. As further examples, metrics may include any value related to the size (length, height, area, etc.), shape, color (RGB, hue, etc.), texture, etc., of an embryo. As a specific example, metrics related to the color of an embryo may include the mean standard deviation, coefficient of skewness, and coefficient of kurtosis for each color as well as hue, saturation, and intensity. Metrics related to the texture of an embryo may include detail coefficients and smooth coefficients. As a further specific example, a set of statistics may be calculated from the perimeter of an embryo and its wavelet decomposition, to produce metrics that quantify the shape information of an embryo. In addition, metrics can be derived from external considerations, such as embryo processing costs, embryo processing time, and the complexity of an assembly line required for sorting embryos by quality. In one embodiment, principal component analysis (PCA), well known in the art, may be applied to calculate metrics. For a given data set, PCA constructs a set of orthogonal vectors (principal components) which correspond to the directions of maximum variance in the data. Typically, 100 to 1,000 metrics may be calculated from each embryo's image or spectral data, although of course more or less number of metrics may be calculated depending on each application. "Metrics" may include the raw image or spectral data.

Once the image or spectral data are obtained and various metrics calculated therefrom, each set of metrics calculated from the set of image and/or spectral data obtained from an embryo is associated with a certain class label according to the embryo's known quality. Then in FIG. 1, block 14, penalized logistic regression (PLR) analysis is applied to the sets of metrics and their corresponding class labels to develop a PLR-based classification model (or classifier) for classifying embryos according to their putative quality. Generally, a classification model is deduced from a "training" data set of plant embryos or portions thereof having known embryo quality. Specifically, the embryos providing the training data set are classified into one of multiple (two or more) quality classes, according either to morphological comparison to normal zygotic embryos or to actual planting and a follow-up study of the embryos.

Logistic regression is used to model the posterior probabilities of K classes with linear functions of inputs x, where K is a finite number of classes. The most common application of logistic regression is for two classes, although the general form of logistic regression may be specified for an arbitrary number of classes.

Logistic regression models are typically fit by maximum likelihood as is well known in the art. Let L(b) denote the usual log likelihood or any function proportional to the log likelihood for the logistic regression model; then a PLR model is fit by finding the value of b that maximizes the penalized log likelihood, generally given by:

$$L(b) - f(b) \quad \text{(Equation 1)}$$

where b represents a vector or matrix of model parameters and f(b) is a real valued function of b. In practice, the true maximum of Equation 1 is typically not found and instead an approximate numerical solution is given.

Non-limiting examples of f include the quadratic penalty:

$$\frac{\lambda}{2} \sum_{i=1}^{p} b_i^2 = \frac{\lambda}{2} \vec{b}^T \vec{b} \quad \text{(Equation 2)}$$

and the generalized quadratic penalty:

$$\frac{\lambda}{2} \sum_{i=1}^{p} \left( b_i \sum_{j=1}^{p} b_j \Omega_{ij} \right) = \frac{\lambda}{2} \vec{b}^T \Omega \vec{b} \quad \text{(Equation 3)}$$

where $\Omega_{ij}$ is the value of the $i^{th}$ row and $j^{th}$ column of a (p×p) matrix $\Omega$, $\lambda$ is a scalar quantity, and p is the number of model parameters. The form of f in two-class classification or any other multi-class classification with PLR is not limited to Equations 2 or 3 and may be any real valued function of the model parameters.

PLR has an advantage over distance-based classification methods, such as principal components analysis (PCA) or linear discriminant analysis (LDA), by additionally providing an estimate of the underlying class probabilities. These probabilities may also be used to account for unequal costs related to misclassification (e.g., a "false-positive"—classifying an unacceptable embryo as acceptable—may be more costly than a "false-negative"-classifying an acceptable embryo as unacceptable).

As discussed above, in one embodiment, a method of the present invention may be used to classify embryos into generally two classes of relatively high-quality, acceptable embryos and relatively low-quality, unacceptable embryos. In this embodiment, a set of training data is given as $(\vec{x}_1, c_1)$, $(\vec{x}_2, c_2), \ldots (\vec{x}_n, c_n)$, where the input $\vec{x}_i$ is a p-vector $\vec{x}_1 = (x_{i1}, x_{i2}, \ldots x_{ip})^T$ where $x_{i1}, x_{i2}, \ldots x_{ip}$ are metrics calculated from each embryo and the output $c_i$ assumes one of two class values, for example $\{1, 2\}$, representing acceptable and unacceptable classes, respectively.

The conditional probability of a sample being in class 1 ($P_1$) or class 2 ($P_2$) given $\vec{x}_i$ is denoted as:

$$P_1(\vec{x}) = \frac{1}{1 + e^{-f_1(\vec{x})}} \quad \text{(Equation 4)}$$

$$P_2(\vec{x}) = 1 - P_1(\vec{x}) \text{ where} \quad \text{(Equation 5)}$$

$$f_1(\vec{x}) = \sum_{i=1}^{p} b_{1i} x_i = \vec{b}_1^T \vec{x} \quad \text{(Equation 6)}$$

where $b_{1j}$ are coefficients for $x_j$.

Given the training set $(\vec{x}_1, c_1)$, $(\vec{x}_2, c_2), \ldots (\vec{x}_n, c_n)$, the log-likelihood is $$L(b) = \sum_{i=1}^{n} \left\{ y_i \vec{b}_1^T \vec{x}_i - \ln\left(1 + e^{\vec{b}_1^T \vec{x}_i}\right) \right\} \quad \text{(Equation 7)}$$

where $y_i$ is an indicator variable for class 1, and $\vec{b}_1$ is a vector of parameters whose $i^{th}$ element is $b_{1i}$.

The penalized log likelihood for this example is obtained by substituting Equation 7 and a penalty function into Equation 1. Using the generalized quadratic penalty in Equation 3 this gives:

$$\sum_{i=1}^{n} \left\{ y_i \vec{b}_1^T \vec{x}_i - \ln\left(1 + e^{\vec{b}_1^T \vec{x}_i}\right) \right\} - \frac{\lambda}{2} \vec{b}_1^T \Omega \vec{b}_1 \quad \text{(Equation 8)}$$

The penalized logistic regression model is fit by finding $\vec{b}_1$ that maximizes Equation 8. An appropriate value of $\lambda$ may be chosen by cross-validation, and an appropriate $\Omega$ may be chosen from subject matter knowledge, although other methods are available as should be apparent to one skilled in the art.

The foregoing describes a general concept of PLR as well as a specific case of PLR as one example, and it should be apparent to one skilled in the art that various specific penalty functions and algorithms for implementing a PLR analysis to the images and/or spectral data obtained from embryos are possible.

Referring back to FIG. 1, in block 16, once the PLR-based classifier is developed, the classifier is then applied to images and/or spectral data obtained from embryos of unknown quality to classify the same. Specifically, a predicted probability of germination for each embryo can be obtained by applying the PLR-based classifier to the image and/or spectral data obtained from the embryo, or more specifically, to metrics calculated from the image and/or spectral data. In various exemplary embodiments of the present method, embryos with a certain minimum probability of germination would then be retained as acceptable.

As is well known in the art, any classifier (or classification model) needs to be tested to verify its performance. Usually, this is done by excluding some of the data from the training set of the classification model, and using the model to classify the excluded data and calculating how well the model performed. Several methods are described in the literature for performing such tests, as well known in the art. For example, one method repeatedly and randomly splits the original data into a training set and a test set to repeat the testing process. Alternatively, all the data can be used to train the model and new data are collected and classified by the model. The results are then checked to see how well the model performed.

EXAMPLES

Three genotypes (56, 68, and 75) of somatic embryos were used to develop and test PLR-based classifiers. NIR reflectance data were obtained from somatic embryos of known quality (thus associated with certain class labels), and PLR analysis was performed on the NIR data sets. Predictive models for embryos' germination tendency were built based on PLR analysis, and their predictive accuracy was assessed using cross-validation. A reduced summary of some of the results are shown in the tables below.

TABLE 1

(GENOTYPE 56)

| $P_{crit}$ | Penalty = 0.01 | | | Penalty = 0.1 | | | Penalty = 1 | | |
|---|---|---|---|---|---|---|---|---|---|
| | OCR | PPV | PPF | OCR | PPV | PPF | OCR | PPV | PPF |
| 0.5 | 0.64 | 0.62 | 0.49 | 0.64 | 0.63 | 0.49 | 0.64 | 0.63 | 0.47 |
| 0.75 | 0.64 | 0.73 | 0.14 | 0.60 | 0.79 | 0.13 | 0.55 | 0.91 | 0.03 |
| 0.85 | 0.60 | 0.80 | 0.13 | 0.56 | 0.92 | 0.05 | NA | NA | NA |

TABLE 2

(GENOTYPE 68)

| $P_{crit}$ | Penalty = 0.01 | | | Penalty = 0.1 | | | Penalty = 1 | | |
|---|---|---|---|---|---|---|---|---|---|
| | OCR | PPV | PPF | OCR | PPV | PPF | OCR | PPV | PPF |
| 0.5 | 0.71 | 0.71 | 0.51 | 0.75 | 0.73 | 0.63 | 0.75 | 0.72 | 0.55 |
| 0.75 | 0.70 | 0.79 | 0.35 | 0.66 | 0.79 | 0.28 | 0.62 | 0.88 | 0.14 |
| 0.85 | 0.67 | 0.82 | 0.27 | 0.62 | 0.83 | 0.16 | 0.53 | 1.00 | 0.03 |

TABLE 3

(GENOTYPE 75)

| $P_{crit}$ | Penalty = 0.01 | | | Penalty = 0.1 | | | Penalty = 1 | | |
|---|---|---|---|---|---|---|---|---|---|
| | OCR | PPV | PPF | OCR | PPV | PPF | OCR | PPV | PPF |
| 0.5 | 0.68 | 0.68 | 0.54 | 0.70 | 0.69 | 0.56 | 0.70 | 0.68 | 0.59 |
| 0.75 | 0.64 | 0.73 | 0.31 | 0.60 | 0.75 | 0.23 | 0.55 | 0.76 | 0.14 |
| 0.85 | 0.57 | 0.74 | 0.19 | 0.53 | 0.80 | 0.09 | 0.50 | 0.86 | 0.02 |

In the tables above, "OCR" stands for Overall Classification Rate, which is a fraction of embryos that are correctly classified. "PPV" stands for Positive Predictive Value, which is a fraction of embryos predicted to germinate that actually germinated as verified by a follow-up study. "PPF" stands for Positive Predicted Fraction, which is a fraction of embryos predicted to germinate. Thus, "PPF" can be thought of as the fraction of embryos retained to be incorporated into manufactured seeds, and "PPV" can be thought of as the germination rate of those retained embryos. Two "tuning" parameters for PLR were used: the "penalty" (λ) and the "critical probability" ($P_{crit}$). $P_{crit}$ is a minimum threshold probability of success (e.g., probability of germination). The tables above show classification results for several values of "penalty" and "critical probability," respectively. Note that other tuning parameters such as Ω are embedded in PLR. Variations of these parameters were investigated, but found to give similar results to those shown above. The estimated population level germination rates (i.e., overall germination rates without classification) for genotypes 56, 68, and 75 are 0.477, 0.481, and 0.523, respectively.

Figure 2A:
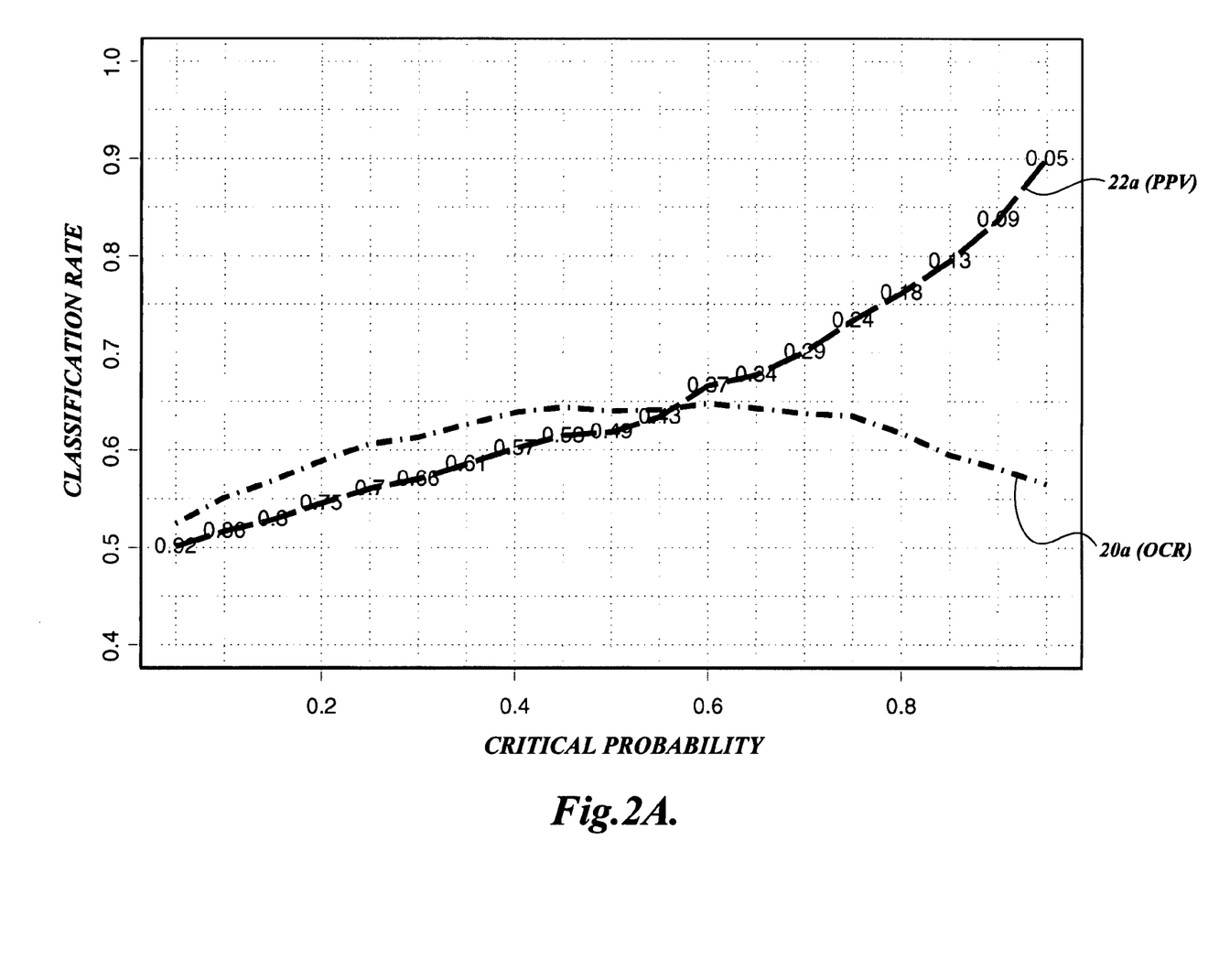
FIGS. 2A, 2B, and 2C are graphs illustrating various classification statistics results of classifying embryos using PLR, obtained in one exemplary implementation of the present method.
Figure 2B:
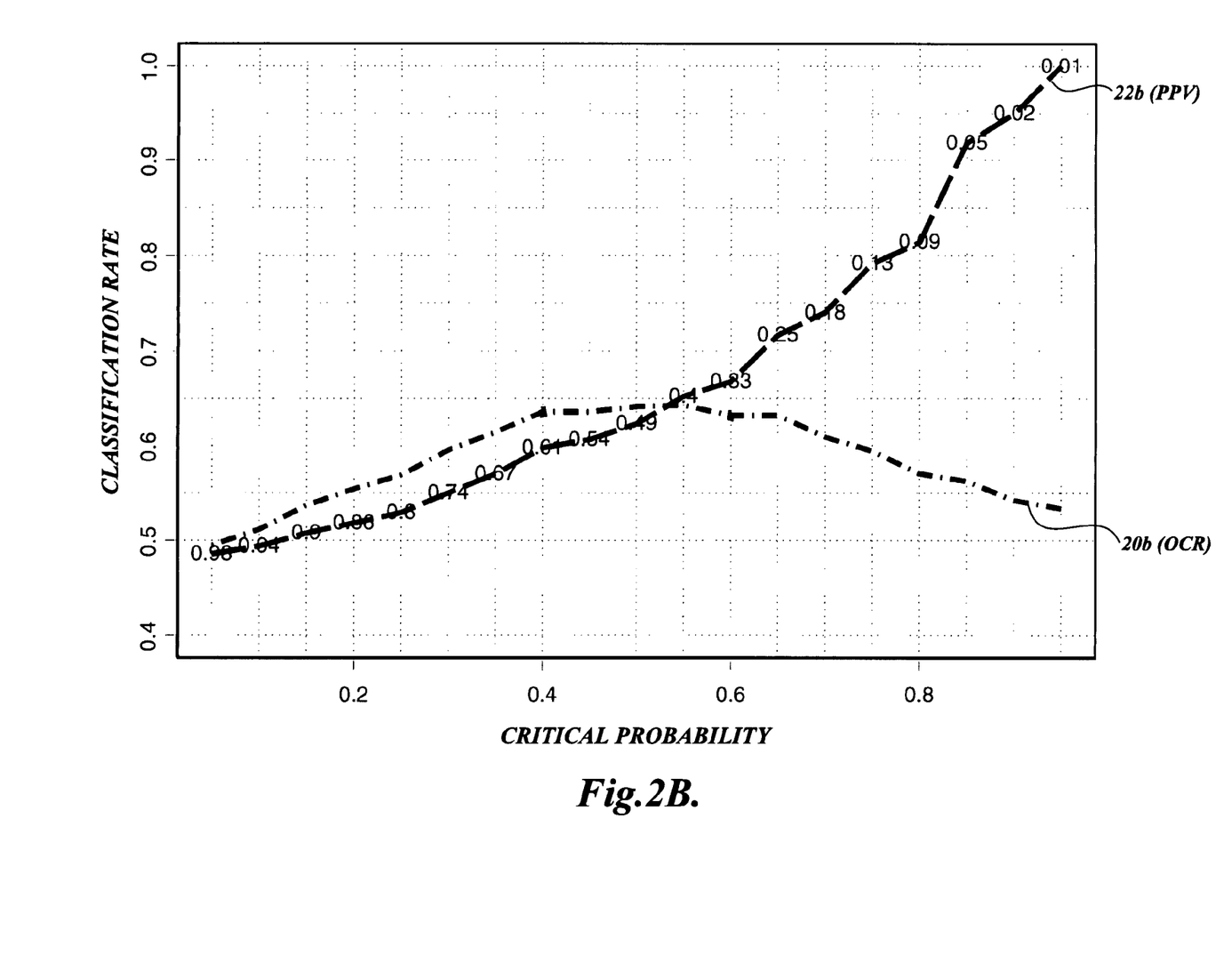
Figure 2C:
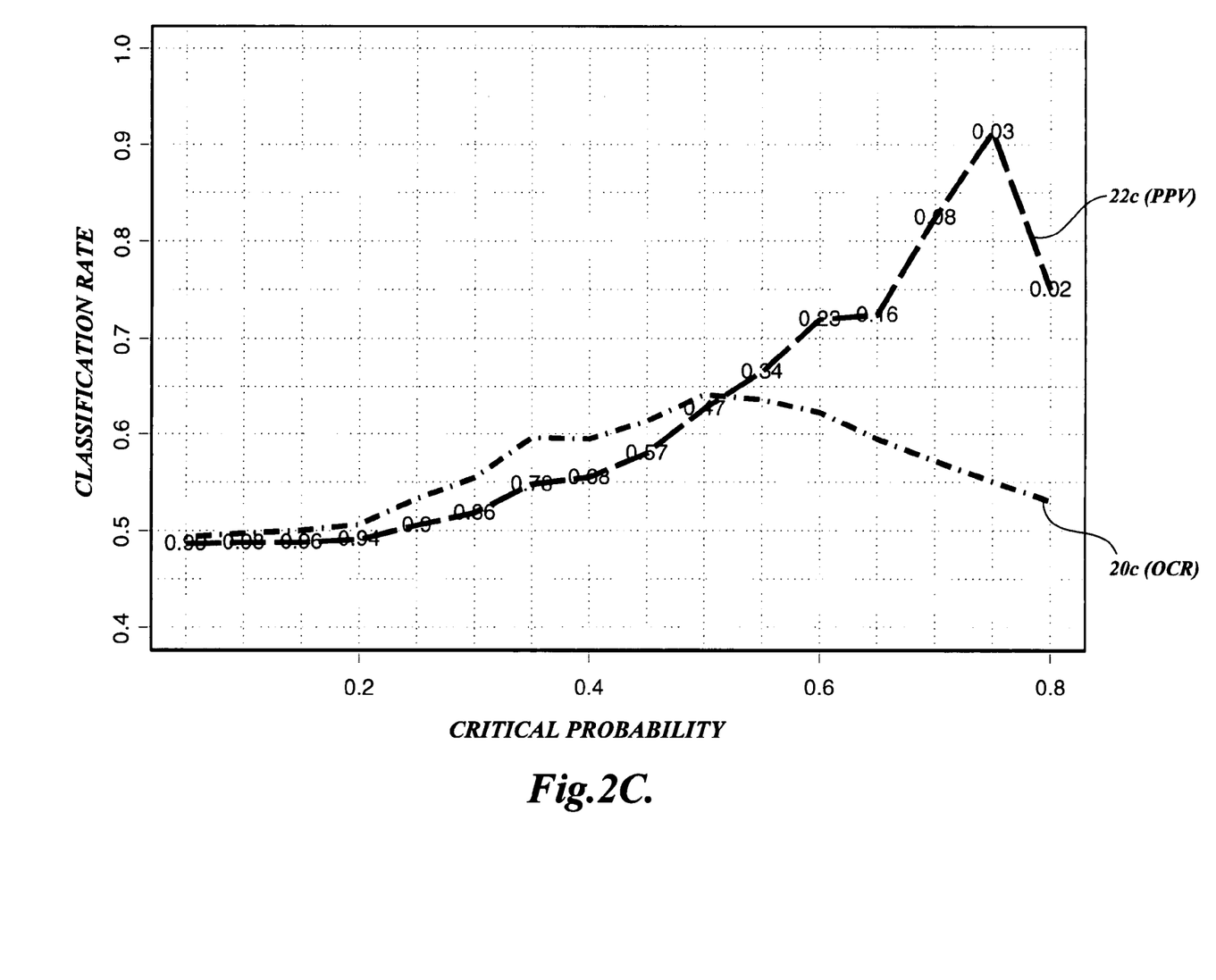

The important statistics in these tables are PPV (the germination rate of the retained embryos) and PPF (the fraction of embryos retained). FIGS. 2A, 2B, and 2C are graphs corresponding to TABLE 1 for Genotype 56 with penalty value being 0.01, 0.1, and 1, respectively. In FIGS. 2A, 2B, and 2C, lines 20a, 20b, and 20c represent OCR (Overall Classification Rate), while lines 22a, 22b, and 22c represent PPV, and the numbers provided on PPV lines represent PPF.

To illustrate the classification performance of PLR, we consider the results for genotype 56 as summarized in TABLE 1 and FIGS. 2A-2C. The population level germination rate of genotype 56 is estimated to be 47.7% (i.e., PPV=0.477 when PPF=1.0), as noted above. For penalty=0.1, the results in TABLE 1 indicate that the germination rate of somatic embryos is increased from the population rate of 0.477 to 0.63 by using PLR with $P_{crit}$=0.5.

The germination rate (PPV) can be further improved by increasing the critical probability, $P_{crit}$. However, increasing $P_{crit}$ will result in a decrease in the fraction of retained embryos (PPF). For example, at penalty=0.1, the germination rate for genotype 56 can be increased to 0.92 by increasing $P_{crit}$ to 0.85, but this reduces PPF to 0.05. In other words, in order to achieve the germination rate of 0.92, as much as 95% of the embryos must be culled because only 5% of the embryos have the probability of germination equal to or greater than 0.85 ($P_{crit}$).

The results of PLR analysis using NIR data to classify somatic embryos according to their germination tendency indicate that PLR provides for improved classification over PCA, LDA, penalized discriminant analysis, and boosting. The improvement is primarily a result of accounting for unequal misclassification costs. For example, previous cross-validated results for embryo classification in terms of PPV (Positive Predictive Value) were about 70% for genotypes 68 and 75 and about 60% for genotype 56. In contrast, PLR-based cross-validated results for embryo classification in terms of PPV were increased to about 80% for genotypes 68, 75 and 56.

The present method is preferably implemented using software (computer program) running on a computer to perform the steps of the method. A suitable selection of a computer and coding of the program to carry out the steps of the method would be apparent to one skilled in the art. Any computer language or software that can perform numeric linear algebra could be used to implement the PLR algorithm according to the present invention. In one embodiment, the algorithm may be implemented in the S language.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of classifying plant embryos according to their germination potential, comprising the steps of:
   (a) using a scanner, acquiring sets of image and/or spectral data from plant embryos of known germination potential, respectively;
   (b) using a computer, associating each of the acquired sets of image and/or spectral data acquired from a plant embryo with one of multiple class labels corresponding to the embryos' known germination potential;
   (c) using the computer, calculating a set of metrics based on each of the acquired sets of image and/or spectral data, wherein each set of metrics is associated with a class label corresponding to the germination potential of the embryo based on which the set of metrics is calculated;

(d) using the computer, applying a penalized logistic regression (PLR) analysis to the sets of metrics and their corresponding class labels to develop a PLR-based classification model;
(e) using a scanner, acquiring sets of image and/or spectral data from plant embryos of unknown germination potential and calculating sets of metrics based on the acquired sets of image and/or spectral data of the plant embryo of unknown germination potential, respectively;
(f) using a computer, applying the PLR-based classification model to the sets of metrics calculated for the plant embryos of unknown germination potential to classify the same according to their predicted germination potential; and
(g) using the computer, outputting a result of the classification of the plant embryos of unknown germination potential to a user, wherein the result includes a positive predicted fraction (PPF), which is a fraction of embryos that are predicted to germinate among the plant embryos of unknown germination potential, and a positive predictive value (PPV), which is a fraction of embryos that actually germinate among the embryos that are predicted to germinate, for a predefined minimum threshold probability of germination ($P_{crit}$), wherein the PPV is improved when the $P_{crit}$ is increased and the result accounts for unequal misclassification costs.

2. The method of claim 1, wherein the image and/or spectral data are digitized.

3. The method of claim 1, wherein the image and/or spectral data are obtained from more than one view of each plant embryo.

4. The method of claim 1, wherein the plant embryos are plant somatic embryos.

5. The method of claim 1, wherein the plant is a tree.

6. The method of claim 5, wherein the tree is a member of the order Coniferales.

7. The method of claim 6, wherein the tree is a member of the family Pinaceae.

8. A computer including computer-executable instructions, wherein the instructions perform the steps comprising:

(a) receiving sets of metrics calculated based on acquired image and/or spectral data of plant embryos of known germination potential, respectively, wherein each set of metrics is associated with one of multiple class labels according to the corresponding embryos' known germination potential;
(b) applying a penalized logistic regression (PLR) analysis to the received sets of metrics and their corresponding class labels to develop a PLR-based classification model;
(c) receiving sets of metrics calculated based on sets of image and/or spectral data from plant embryos of unknown germination potential, respectively;
(d) applying the PLR-based classification model to the sets of metrics calculated for the plant embryos of unknown germination potential to classify the same according to their predicted germination potential; and
(e) outputting a result of the classification of the plant embryos of unknown germination potential to a user, wherein the result includes a positive predicted fraction (PPF), which is a fraction of embryos that are predicted to germinate among the plant embryos of unknown germination potential, and a positive predictive value (PPV), which is a fraction of embryos that actually germinate among the embryos that are predicted to germinate, for a predefined minimum threshold probability of germination ($P_{crit}$), wherein the PPV is improved when the $P_{crit}$ is increased and the result accounts for unequal misclassification costs.

9. The computer of claim 8, wherein the plant embryos are plant somatic embryos.

10. The computer of claim 8, wherein the plant is a tree.

11. The computer of claim 10, wherein the tree is a member of the order Coniferales.

12. The article computer of claim 11, wherein the tree is a member of the family Pinaceae.

13. The computer of claim 12, wherein the tree is selected from the group consisting of genera *Pseudotsuga* and *Pinus*.

* * * * *